United States Patent
Cox

(10) Patent No.: US 7,409,555 B2
(45) Date of Patent: Aug. 5, 2008

(54) ELECTRONIC DOCUMENT ACTIVE CONTENT ASSURANCE

(75) Inventor: Alan Cox, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 24 days.

(21) Appl. No.: 10/361,307

(22) Filed: Feb. 10, 2003

(65) Prior Publication Data

US 2004/0158717 A1    Aug. 12, 2004

(51) Int. Cl.
*H04L 9/00* (2006.01)
*G09C 5/00* (2006.01)

(52) U.S. Cl. .............. 713/176; 713/179; 713/181; 713/186; 382/137; 382/138; 382/139; 382/135; 380/246; 380/277

(58) Field of Classification Search ............... 713/176; 382/139, 140
See application file for complete search history.

(56) References Cited

U.S. PATENT DOCUMENTS

| | | | | |
|---|---|---|---|---|
| 5,151,948 | A * | 9/1992 | Lyke et al. | 382/138 |
| 5,157,726 | A * | 10/1992 | Merkle et al. | 713/176 |
| 6,085,322 | A * | 7/2000 | Romney et al. | 713/176 |
| 6,351,553 | B1 * | 2/2002 | Hayosh | 382/139 |
| 6,600,823 | B1 * | 7/2003 | Hayosh | 380/51 |
| 6,775,821 | B2 * | 8/2004 | Scouten | 717/115 |

FOREIGN PATENT DOCUMENTS

EP    1 576 958 A1    9/2005

OTHER PUBLICATIONS

Zurko et al. "Did You Ever Have To Make Up Your Mind? What Notes Users Do When Faced With A Security Decision", Proceedings of the 18th Annual Computer Security Applications Conference, pp. 371-381 (2002).
European Search Report from EP Application No. 04 70 9434 dated May 23, 2006.

* cited by examiner

*Primary Examiner*—Syed A. Zia
(74) *Attorney, Agent, or Firm*—Wilmer Cutler Pickering Hale and Dorr LLP

(57) ABSTRACT

A system and method are presented for assuring electronic documents containing active content. Aspects of the system and method are directed to storing a copy of input data called by the active content in a first invocation of the electronic document, then, on subsequent invocations of the electronic document, using the stored copy of the input data instead of calling for input data from the computing environment. In this way, the output from the subsequent invocations of the electronic document are the same as the output from the first invocation of the electronic document.

16 Claims, 4 Drawing Sheets

ELECTRONIC DOCUMENT ACTIVE CONTENT ASSURANCE

TECHNICAL FIELD

The present invention generally relates to electronic documents. More particularly, aspects of the present invention relate to assurance and verification of digitally signed electronic documents containing active content.

BACKGROUND

With the proliferation of electronic documents and the increased reliance on electronic documents, e.g., in electronic commerce, the use of electronic or digital signatures is becoming more widespread. An "electronic document" can include any collection of organized information, which is stored, transmitted, read, or written, in electronic form. Examples of electronic documents include files, folders, directories and other data structures and organized representations of information used in conjunction with computers, digital communication systems and other electronic media.

One difference between conventional paper documents and electronic documents is that while paper documents display on their face what is contained therein, electronic documents may contain content which is not apparent on the face of the electronic document. Electronic documents may contain codes and nonvisible characters and data in addition to their visible content. As an example, electronic documents may contain embedded control characters, used for the purpose of sending an instruction to a display terminal to make changes in the physical appearance of the document. As another example, metadata may be incorporated into an electronic document to perform other functions related to the appearance or formatting of the document. One example of metadata includes metatags, used in mark-up languages such as hypertext mark-up language (HTML) to format and index an HTML document.

In addition, electronic documents may include macros or active content. "Active content" can include executable electronic content that can take an input or a set of inputs, and cause a result based on the input or set of inputs. Active content may include nonvisible, executable instructions within the electronic document, such as macros. A "macro" may be an instruction or a set of instructions that perform a specific function or task, usually in the context of a software application. Active content and macros typically operate on the electronic document within its environment, using the inputs as parameters. Macros may be simple or complex, with some applications allowing almost arbitrary programming capability within the macro environment. One consequence of including active content in electronic documents is the possibility of compromising the integrity of the document from the standpoint of document security.

It is customary for a person to sign a document as a mark of authenticity, using a signature uniquely identifying the person signing the document. Various types of conventional signatures are known, such as seals, fingerprints and handwritten signatures. Since traditional signature methods are not normally applied to electronic documents, special electronic or "digital signatures" have been developed for this purpose. Digital signatures, in analogy with conventional signatures, allow the owner of the signature to impart a unique identifier to that which is to be identified. In the case of a typical digital signature, the holder of the signature attaches a unique electronic code to the electronic document. The electronic document, together with the digital signature, can then be stored or transmitted in electronic form and later identified with the signature holder. Typically, the digital signature is specific to the person (or entity) signing the electronic document and the content of the electronic document. "Digital signatures" can include numerous means of signing an electronic document, generally, and include known methods based on public key infrastructure (PKI), digital watermarks, and other methods for verifying, identifying and/or securing a document.

Systems and methods for identification, verification, authentication and/or non-repudiation of electronic documents are generally referred to herein as "assurance" systems and methods. Electronic document assurance systems and techniques may provide one or more of these functions, however, assurance is not so limited. Other functions falling under the general umbrella of assurance services may be provided either directly or indirectly, and are essentially directed to improving the security of electronic document transfer and storage and/or to minimizing intentional or unintentional compromises to the integrity of electronic documents.

A conventional paper document typically displays on its face substantially all that is contained therein, and photocopies thereof will display the same. An electronic document can include both the electronic document "corpus," stored or transmitted, or existing in electronic form, as well as a corresponding perceptible, observable, or visible form that is presented to users of the electronic document, such as by displaying an output onto a computer monitor or printer. It should be understood that a perceptible instance of an electronic document, such as the output displayed onto a computer monitor or printed onto a printer, is merely an output generated to correspond to the electronic document and its content. The output may be presented to a user or viewer of the document in whole or in part and may appear in various forms. This perceptible output is a representation of the document corpus and data, and reflects in part any active content and input data used to produce the observed output.

Embedding active content into an electronic document can make it difficult to verify that the output as seen and digitally signed by a party when presented with the output in a first instance is identical to the output as seen in a second instance. This is especially true if the active content is not visible to the party viewing or invoking the document. An electronic document is said to be "presented" or "invoked," referring to any recall, viewing, editing, transmission or other use of or interaction with the electronic document. One example of invoking an electronic document is the act or process of viewing a document containing text or graphical output on a display device. More specifically, one example is the process of retrieving a stored word processing file and displaying its corresponding output on a computer monitor or printing the same on a printer.

Active content can manipulate or alter the way an active electronic document is perceived or displayed, resulting in a lowered confidence level in the authenticity of the active electronic document. This may occur accidentally or intentionally and may take place without the knowledge or permission of the electronic document's users. Attaching a digital signature to the electronic document still leaves a question as to its integrity. The reason for this being that no change to the corpus of the electronic document (e.g., rewriting the data in the electronic file) needs to occur to alter the visible output of the active document. Digital signatures merely attest to the integrity of the underlying electronic file and do not assure that the output of active electronic documents has not been altered by the active content.

This problem is not cured by delivery of the digitally signed document to an uninterested party, or placing the document in an electronic escrow account, because embedded active content or macros within the document may become activated by an input to alter the document and any copies of the document, including copies kept with the uninterested party or in escrow. Furthermore, as explained above, since the actual electronic file's corpus is not altered by the active content, there is typically no indication that the displayed form of the document has been changed from one invocation of the document to the next.

Information, such as the date of the formation of the contract, may be automatically inserted into a contract document for convenience, such as by soliciting the time and/or date information from the operating system. This solicited information is an input to the electronic document, corresponding to a "system call" caused by instructions from its active content. Many applications routinely pass system calls, such as queries, to their environments or operating systems to obtain input information required by the applications. Date and time queries are typical of such queries, which may be used by active content to modify the output of electronic documents.

In some instances, for example in cases where goods, services and funds are exchanged frequently between the same two parties, the two parties may agree to have a software application automatically generate the individual corresponding contracts for convenience. For example, the two parties may have agreed that the amount owed by one party to another is to be calculated from a related document, such as a spreadsheet.

To illustrate a possible adverse consequence of the preceding situation, consider the simple case of a contract, formed electronically between parties A and B, and executed using digital signatures. The contract may be in the form of a word processing document, and may contain active content or macros, either embedded by the application vendor, the parties to the contract, or by another party. The contracting parties may have agreed that B will render goods or services to A, and in return A will pay $1,000 to B. The figure $1,000 may be calculated by a spreadsheet application and automatically inserted into the word processing document using a macro. The calculation may involve parameters which may change without the knowledge of the parties, causing the apparently-agreed upon payment amount to change.

This scenario and others can arise using presently-accepted electronic document technology and practices.

SUMMARY

One or more aspects of the present invention provide a system and method for assuring electronic documents containing active content. Various embodiments are directed to computer documents containing nonvisible instructions such as macros that can cause a perceived output of a document to appear differently from one invocation of the document to another. Digitally signed or unsigned documents are comprehended by embodiments of the present invention. Security enhancements due to aspects of the invention include authentication of document content and output form on subsequent invocations or executions of a document, and limiting, preventing, or identifying unauthorized changes to document output, e.g., visible output.

In some embodiments, a signed electronic document is invoked and input data called by the electronic document's active content is duplicated, logged, or stored for later use. On a subsequent invocation, the active content is provided with the copy of the input data that was duplicated, logged, or stored in the first invocation rather than providing the active content with fresh inputs from the computing environment. In this way an exact replica of the electronic document's output can be achieved from one invocation to another.

The stored copy of the original input data may itself be digitally signed to ensure its originality, and the stored input data may be kept in a secure storage location.

DETAILED DESCRIPTION

Figure 1:
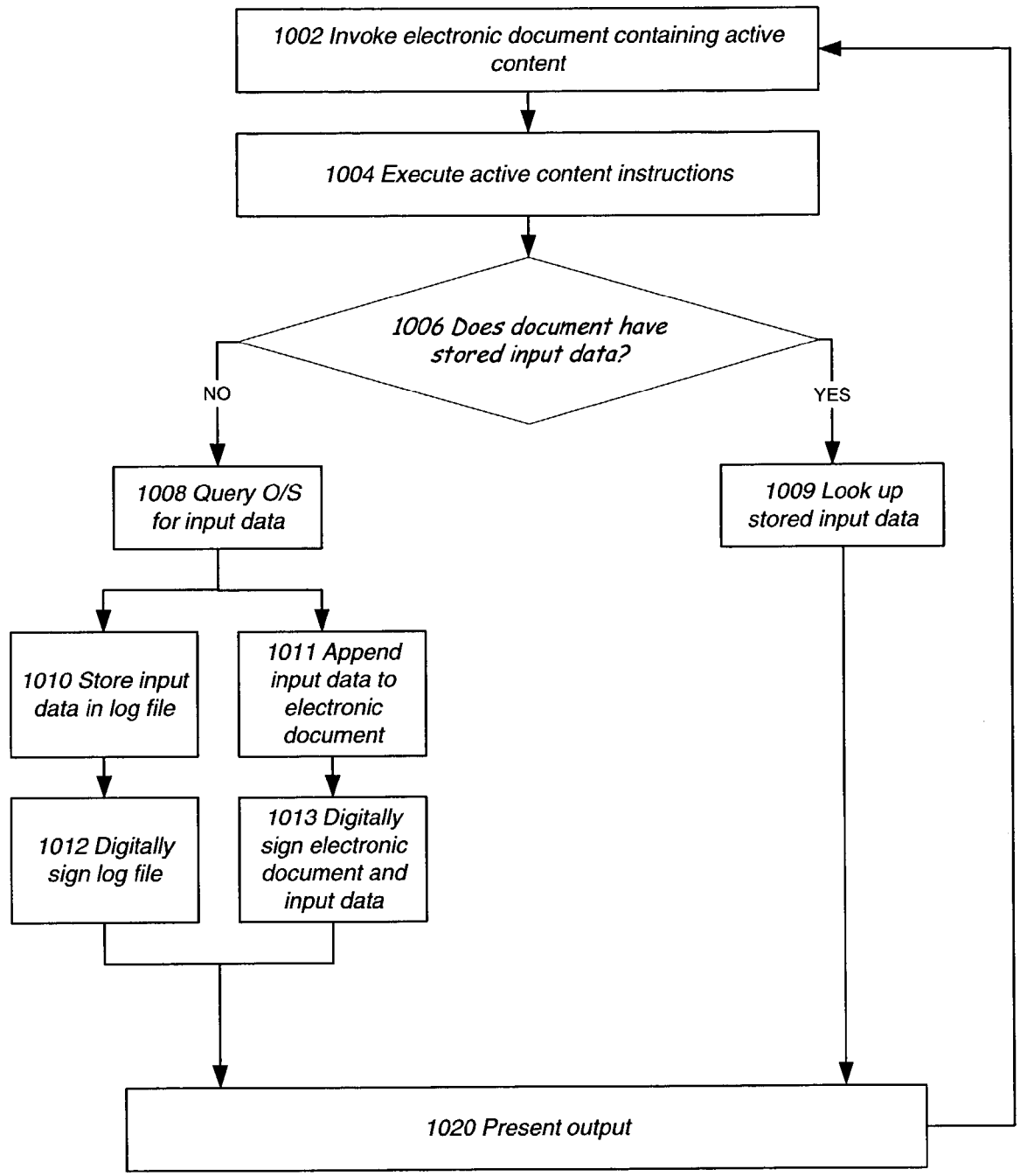
FIG. 1 illustrates an exemplary schematic process for assuring electronic documents containing active content according to an embodiment of the present invention.

In one or more embodiments of the present invention, an electronic document containing active content will itself be digitally signed as well as a log of all information requested and exchanged between the active document and its environment. That is, digital signatures will not only be applied to the electronic document corpus, but additionally to the corpus of a corresponding log of executed code and data exchanged into and/or out of the active electronic document. In some embodiments, the output is kept static by using the same input data called for by the active content each time the document is invoked. Various embodiments of the present invention employ secure log files containing the input data as first used in the first invocation of the corresponding electronic file.

In addition to one or more of the parties to a contract digitally signing the contract, the parties may also create a record log indicative of the fact that the electronic contract document made a query to the operating system requesting the dollar amount to be inserted into the contract, the dates on which the contract was executed, and/or other parameters passed to the application for use in the document.

The record log may be attached or appended to the electronic document itself, or may be recorded to some area of memory in a computer system, associating that area of memory with the electronic document. The recorded log file may be secured by a digital signature to prevent accidental or intentional tampering with the recorded log file.

The document and its embedded executable instructions may be re-executed by one or more of the parties or a third party to recreate the condition of the document (output) at the time it was originally signed by the parties. Rather than providing the inputs to the active content from the operating system or application's environment, the inputs are taken from the log file containing a copy of the inputs originally used at the time of original signing of the document.

Some embodiments of the present invention may utilize built-in debugging technology for the purpose of creating or maintaining recorded logs. Such logs comprising queries and system calls may be created by existing logging software for the purpose of later review by a developer to determine the exact sequence of actions taken by a piece of software under development. For example, in the LINUX operating system, a command known as strace may be used to instruct the operating system to generate a log of instructions and data exchanged between the operating system and an application running on the operating system. In some instances, the strace tool will merely instruct the operating system to activate a separate specialized logging program, which can create and manage log files more efficiently. However, other operating systems also contain logging tools that are generally used for debugging, and which may be modified or used in some other way in conjunction with other aspects of the present invention to generate the logs.

FIG. 1 illustrates schematically a process for assuring electronic documents containing active content according to one or more embodiments of the present invention. In Step 1002, an electronic document containing active content is invoked by a user. In Step 1004, the active content instructions are executed, requiring input data. In 1006, it is determined whether input data associated with the electronic document already exists in storage or in some other form which may be retrieved by the application. If the result of Step 1006 is YES, the required input data is retrieved or looked up in Step 1009 from the appropriate location. The electronic document presents output to the user in Step 1020.

If the result of 1006 is NO, then the application queries the operating system (O/S) for the required input data at Step 1008. The retrieved input data can then be stored into a log file in Step 1010 and the log file is digitally signed in Step 1012, or the input data may be appended to the electronic document in Step 1011 and the entire contents of the document including the input data are digitally signed in Step 1013. As before, once the input data is determined, the appropriate output is presented to the user in Step 1020. Note that the above steps are not necessarily performed in the order described. For example, the sequence of storing the input data and generating the output may be reversed.

Further invocations of the electronic document may be accomplished in the same way as indicated by the outermost arrow of the process exiting from Step 1020.

It should be pointed out that some or all of the methods and systems described herein apply to both electronic documents that are digitally signed and/or unsigned electronic documents. That is, while some embodiments are directed to assuring digitally signed electronic documents having active content, other embodiments are directed to electronic documents having active content that are unsigned. So, a user may wish to use aspects taught by the present invention to check or ensure that the output presented on the user's computer from an active electronic document is unchanged between one invocation of the electronic document and another.

Other intermediate and auxiliary steps may be performed by the application, the operating system and/or other utility applications running in the foreground or in the background with or without explicit user intervention. The utilities or operating system extensions include debugging and logging utilities which may act as intermediate conduits for passing query instructions and results between the application and its environment such as the operating system. Furthermore, auxiliary applications and utilities may generate the log files or pointers required to associate the electronic document with the proper corresponding input data.

Figure 2A:
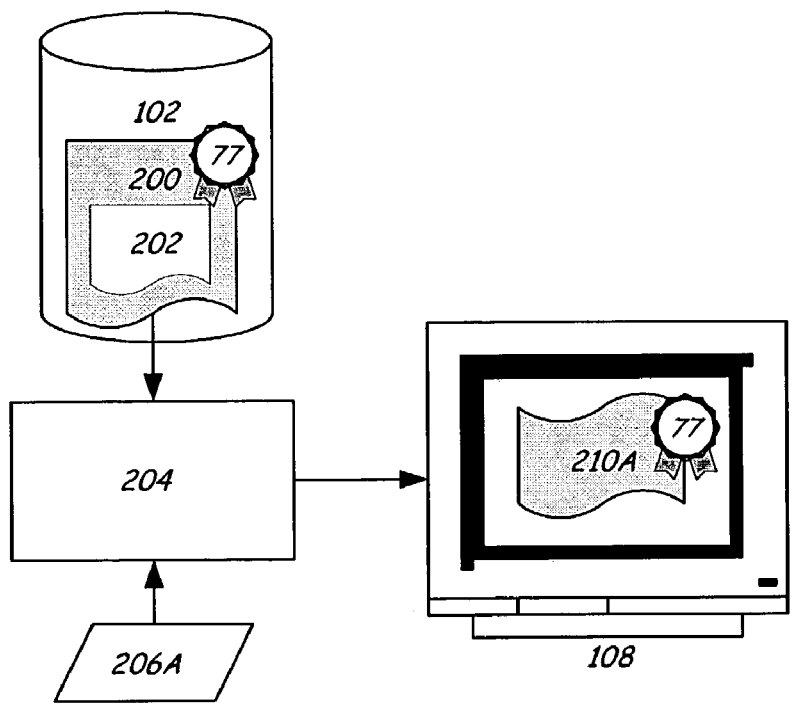
FIG. 2(a) illustrates a first invocation of an electronic document containing active content using a first input data set according to the prior art.
Figure 2B:
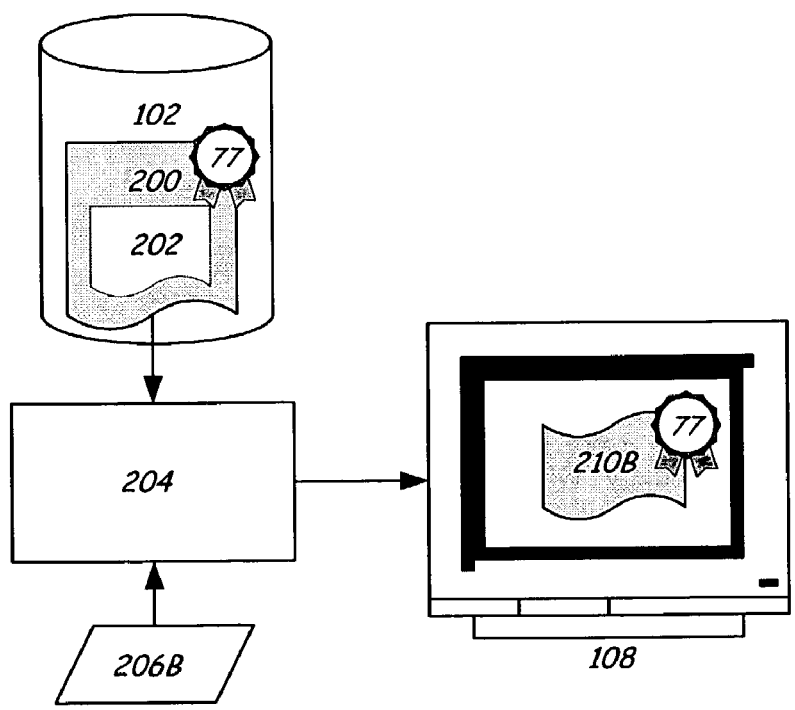
FIG. 2(b) illustrates a second invocation of an electronic document containing active content using a second input data set according to the prior art.

FIGS. 2(*a*) and 2(*b*) illustrate conventional use of electronic documents with digital signatures. As illustrated schematically in FIG. 2(*a*), a software application 204 receives an electronic document 200 from a storage device 102. The electronic document 200 contains active content 202 which requires input data 206A. Input data 206A may be obtained from any suitable source, depending on the nature of the active content, and may for example comprise input information provided by the computing environment or operating system (OS). For example, input data 206A may be a numerical value or a time/date query result called for by the application program 204.

Using the input data 206A, the application program 204 generates an output 210A corresponding to the electronic document 200. The electronic document 200 may be digitally-signed, depicted by digital signature 77, and the resulting output displayed on output device 108 may also indicate the existence and/or validity of the digital signature 77.

FIG. 2(*b*) illustrates the same system shown in FIG. 2(*a*), except that FIG. 2(*b*) represents a subsequent instance of invoking the electronic document 200. Here, a system call will return input data 206B that is then used with the active content 202 to yield an output 210B. The output 210B may be different than the output of the previous invocation 210A, yet it still carries the digital signature 77. Thus, for an electronic document 200 containing active content 202, the results perceived by a user may differ because the application 204 and the electronic document 200 with its active content 202 receive different input data 206A, 206B. This situation may arise in the case where a first instance of invoking the electronic document 200 is shown in FIG. 2(*a*) and a second instance of invoking the electronic document 200 is shown in FIG. 2(*b*).

Figure 3A:
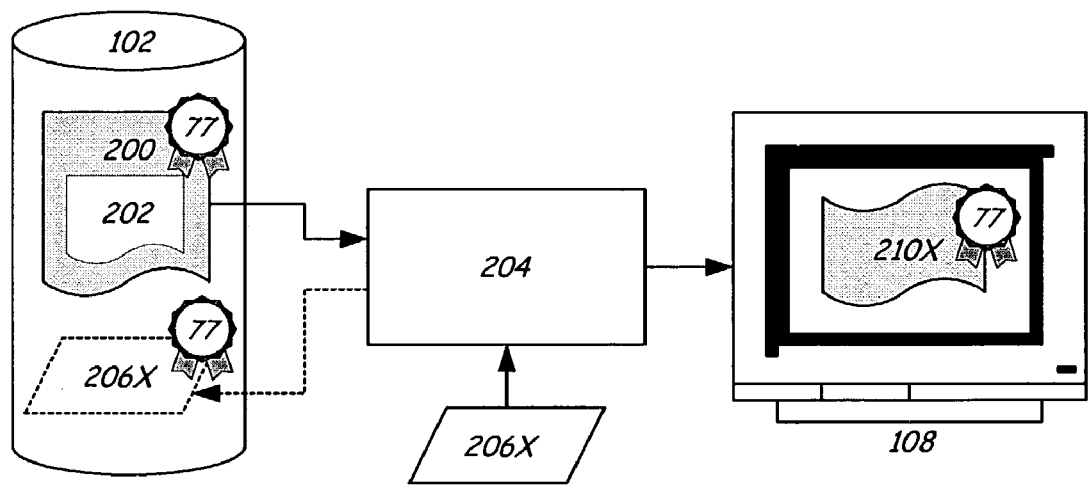
FIG. 3(a) illustrates an exemplary first invocation of an electronic document containing active content showing a signed log file according to an embodiment of the present invention.
Figure 3B:
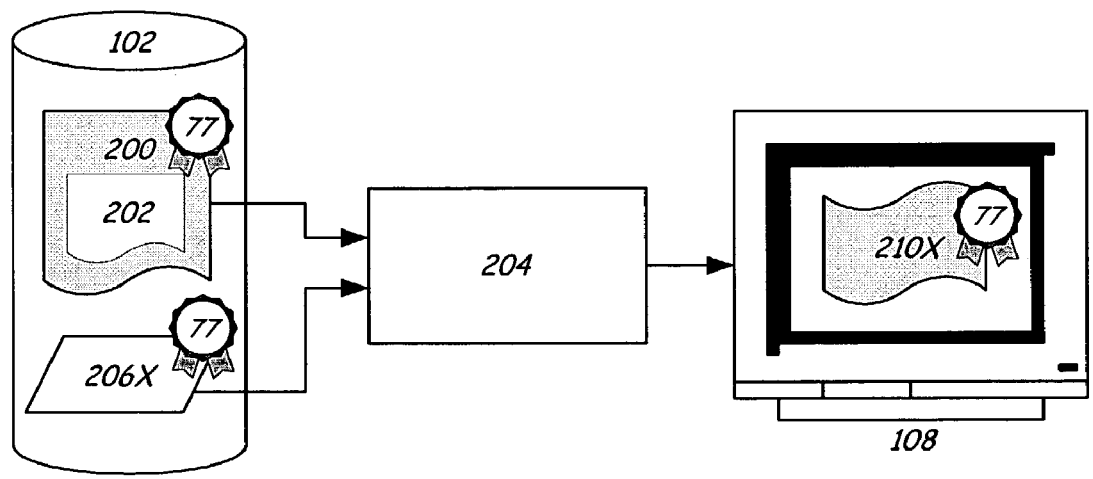
FIG. 3(b) illustrates a second invocation of an electronic document containing active content using input data from a signed stored log file according to an embodiment of the present invention.

In accordance with an embodiment, FIG. 3(*a*) illustrates an application program 204 calling input data 206X from the computing environment to produce an output 210X corresponding to electronic document 200. A copy of input data 206X is also stored onto the storage device 102 and is digitally signed. Electronic document 200 and the stored input data 206X are associated for future use. This may be accomplished by the use of secured or signed links or pointers.

As shown in FIG. 3(*b*), on a subsequent invocation of the electronic document 200 the input data is obtained from the storage device 102 rather than from the computing environment or the operating system. Thus, the input data is as it was in the first invocation. As an example, but not by way of limitation, the outputs 210X in FIGS. 3(*a*) and 3(*b*) are identical.

Figure 4A:
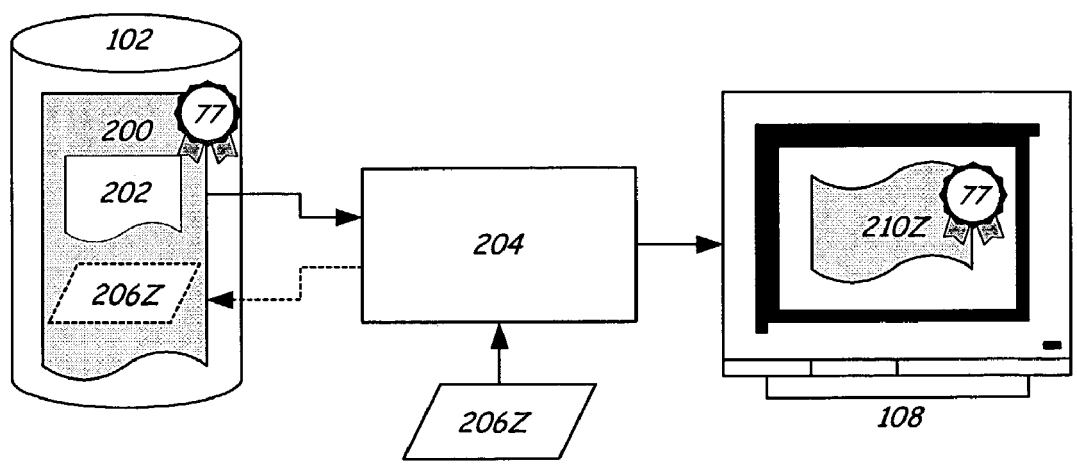
FIG. 4(a) illustrates a first invocation of an electronic document containing active content showing a copy of the input data being appended to the electronic document according to an embodiment of the present invention.

FIGS. 4(*a*) and 4(*b*) illustrate another embodiment of the present invention for assuring consistent output from an electronic document containing active content. In a first instance of invoking electronic document 200, input data 206Z is called by the application 204 from the application environment or operating system. A copy of the input data 206Z is included with the electronic document 200 and the entire result is digitally signed with digital signature 77. Therefore, a document 200 containing active content 202 and any input data 206Z needed by the active content 202 are coupled to one another and stored in storage device 102. An output 210Z is produced on display device 108 corresponding to the document 200 and its input data 206Z. The output perceived by a user carries digital signature 77 to indicate the authenticity of the displayed result.

Figure 4B:
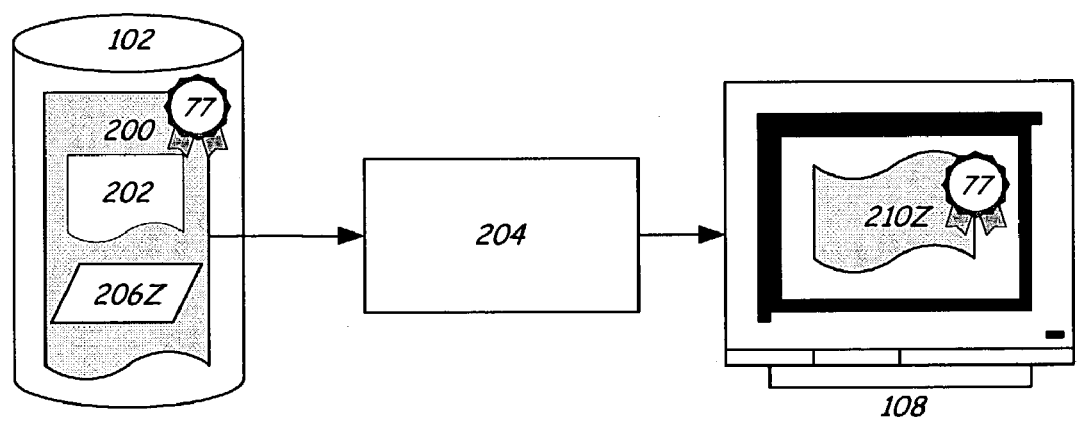
FIG. 4(b) illustrates a second invocation of the electronic document containing active content using the input data appended to the electronic document according to an embodiment of the present invention.

In FIG. 4(b), the document 200 is invoked a second time. Here, rather than obtain new and possibly different input data from the computing environment or operating system, the electronic document 200 and active content 202 use the stored copy of input data 206Z, which was included with the document 200 in FIG. 4(a), and which is identical to the input used during the first invocation. Therefore, the output of the second invocation 210Z is identical to that of the output 210Z in the first invocation.

In some embodiments, all of the input data is stored and used in subsequent invocations of the document. In other embodiments, only some of the input data is stored and used in subsequent invocations, which may allow for some changes to the output from one invocation to another.

An example illustrating some of the concepts described above is presented next in the context of a query for a date input data. A user or an active electronic document may run a command given by the syntax record date.

In a first invocation of the document, a log file is generated corresponding to a sequence of steps and data executed by and used by the process, such as:
load 'date' (signature to verify the date command);
date asks the OS for the time . . . return 11:15 am;
date exits.
A log is generated, and the user then signs the log.
In a subsequent invocation of the document:
load date . . . date asks the OS for the time;
the emulator intercepts the request and supplies 11:15 am;
date exits.

Because the system provided the same (log copy) of the input data used in the first invocation, the user sees the same time as seen in the first invocation.

Another example, given for illustrative purposes, involves POSIX shell encoding, and shows how input data may be called by an invoked script which may be run from the shell command line or from a file containing the instructions. The POSIX/bin/sh commands are human readable in the script format, however, other scripts or instructions may be unreadable by humans. Here, the date is being called as input data:
!/bin/sh
echo "On this date, "$(date)", I the undersigned do agree to pay fifty dollars for the delivery of 100 bags of cement"
echo "Joe Buyer."

Various techniques can be used for implementing the present invention in hardware and/or software. As an example, not meant by way of limitation, the entire execution history of the electronic document within its environment may be stored in a special or protected portion of memory on a computer having such memory. Extra layers of security or protection may also be implemented using any encryption or hardware security means or technique now generally known or later to become known to those skilled in the art.

In addition to archiving or escrowing the electronic document, as has been the practice in the past, the document including its log and/or the log itself may be archived or escrowed so that the log may be used to later confirm or verify the execution history and state of the active electronic file. Normally, log files are small and do not themselves include active data that may be tampered with, but the log files may be secured if necessary, as discussed above.

In one or more embodiments of the invention, the computing environment or the operating system itself is a trusted environment or operating system or platform. In this way modification of the active electronic document using the operating system or its environment would not be likely. Additionally, the interface between the application and the operating system may be monitored or logged so that a trusted operating system that performs differently than the operating system originally used by the parties will cause no changes to the document output.

In yet other embodiments, the system itself is arranged so that parts of the system are protected from other parts of the system, and any tools or software used in the recording or playback (re-execution) process are executed in a secure environment that is protected from tampering by outside agents or components such as non-trusted parts of the operating system. Trusted components may be identified by cryptographic key signatures trusted by the users taking part in a transaction. These same keys may be signed into the log so that neither party may repudiate trust in the system that both parties agreed to trust at the time the document was prepared.

Aspects of the invention may be implemented as a recording (first instance) and playback (subsequent instances) component as part of a software application such as a word processor.

In addition to or instead of recording information and data exchanged between an active electronic document and its environment, the executable instructions themselves may be recorded into the log. In some embodiments, machine code comprising all (or select portions) of the code loaded by an active electronic document may be recorded in the log.

Upon review of the present description and embodiments, those skilled in the art will understand that modifications and equivalent substitutions may be performed in carrying out the invention without departing from the essence of the invention. Thus, the invention is not meant to be limited by the embodiments described explicitly above, rather it should be construed by the scope of the claims that follow.

What is claimed is:

1. A method for reproducing an output of an electronic document containing active content for assurance services and to maintain the integrity of the electronic document, comprising:
invoking the electronic document containing the active content in a first instance;
executing at least one instruction of the active content;
receiving input data corresponding to the active content;
storing data corresponding to the input data;
generating a first output of the electronic document;
invoking the electronic document containing the active content in a second instance; and
using the stored data corresponding to the input data to generate a second output of the electronic document.

2. The method of claim 1, wherein the electronic document is a digitally signed electronic document.

3. The method of claim 1, wherein generating a first output comprises using the input data to generate said first output.

4. The method of claim 1, wherein generating a first output comprises using the stored data corresponding to the input data.

5. The method of claim 1, further comprising affixing a digital signature to the electronic document.

6. The method of claim 1, further comprising affixing a digital signature to the stored data corresponding to the input data.

7. The method of claim 1, wherein storing data corresponding to the input data comprises storing a copy of the input data in an electronic log file distinct from the electronic document.

8. The method of claim 1, wherein storing data corresponding to the input data comprises storing a copy of the input data together with the electronic document in a single electronic file.

9. The method of claim 1, further comprising comparing the first output and the second output.

10. The method of claim 1, further comprising storing a copy of any instructions executed in the course of invoking the electronic document.

11. An information storage device for assurance services and to maintain the integrity of an electronic document including encoded instructions for:
  passing data between the electronic document containing active content and a computing environment, said data including input data corresponding to the active content;
  creating a log;
  storing data corresponding to the input data in the log;
  executing at least one instruction of the active content;
  generating a first output corresponding to the input data and the electronic document containing the active content; and
  generating a second output corresponding to the electronic document containing the active content and the data corresponding to the input data.

12. The storage device of claim 11, further comprising encoded instructions for digitally signing any of the electronic document, the log, the data corresponding to the input data, the first output and the second output.

13. A method for assuring an electronic document containing active content and to maintain the integrity of the electronic document, comprising:
  obtaining an electronic document including active content;
  executing at least one instruction of the active content;
  receiving input data required by the active content;
  digitally signing the electronic document including active content;
  digitally signing a copy of at least a portion of the input data; and
  storing the signed electronic document including active content and the signed copy of the input data.

14. The method of claim 13, further comprising associating the stored electronic document including active content and the stored copy of the input data.

15. A method of authenticating an electronic document containing active content and to maintain the integrity of the electronic document, comprising:
  invoking a stored electronic document including active content;
  executing at least one instruction of the active content;
  receiving a stored copy of input data required by the active content;
  executing the active content instructions on the copy of the input data, and
  generating an output corresponding to the electronic document, and
  comparing the output with another output representing an earlier invocation of the electronic document.

16. A method of authenticating an electronic document containing active content and to maintain the integrity of the electronic document, comprising:
  invoking a stored electronic document including active content;
  executing at least one instruction of the active content;
  receiving a stored copy of input data required by the active content; and
  executing the active content instructions on the copy of the input data, and
  storing a copy of any instructions executed in the course of invoking the electronic document.

* * * * *